United States Patent
Turk

[15] 3,704,741
[45] Dec. 5, 1972

[54] OZONE RESISTANT ETHYLENE/PROPYLENE TERPOLYMER LAMINATES TO OTHER RUBBER

[72] Inventor: David L. Turk, Cuyahoga Falls, Ohio

[73] Assignee: The Goodyear Tire & Rubber Company, Akron, Ohio

[22] Filed: Aug. 17, 1970

[21] Appl. No.: 64,657

Related U.S. Application Data

[62] Division of Ser. No. 619,195, Feb. 28, 1967.

[52] U.S. Cl. .................152/358, 156/331, 161/242, 161/243, 161/253, 161/255, 260/4, 260/5, 260/879, 152/354
[51] Int. Cl. ......B32b 27/08, B32b 27/26, B60c 1/00
[58] Field of Search ......260/4, 5; 161/252, 227, 243, 161/242, 247, 252, 253; 156/331; 152/330, 354, 358

[56] References Cited

UNITED STATES PATENTS

| | | | |
|---|---|---|---|
| 3,343,582 | 9/1967 | Himes et al. | 260/5 X |
| 3,501,422 | 3/1970 | Nordsiek et al. | 260/5 |
| 3,364,155 | 1/1968 | Souffie | 260/4 |
| 3,532,693 | 10/1970 | Sullivan et al. | 260/5 |
| 3,557,028 | 1/1971 | Turk | 260/793 |

Primary Examiner—Robert F. Burnett
Assistant Examiner—C. B. Cosby
Attorney—F. W. Brunner and Vernon G. Parker

[57] ABSTRACT

Sulfur vulcanizable, ozone resistant blends of ethylene/propylene terpolymer and conventional general purpose rubbers containing a sulfonamide/sulfur vulcanization system and capable of adhering to a conventional general purpose rubber composition on vulcanization of the two phases. These blends may be used in the construction of tire sidewalls and cover strips for pneumatic tires.

12 Claims, No Drawings

OZONE RESISTANT ETHYLENE/PROPYLENE TERPOLYMER LAMINATES TO OTHER RUBBER

This is a division of application Ser. No. 619,195, filed Feb. 28, 1967.

This invention relates to sulfur vulcanizable ozone resistant blends of an ethylene/propylene terpolymer and another rubber capable of adhering to conventional rubbers when vulcanized in the presence of a sulfenamide accelerator. In addition, this invention relates to the use of these ozone resistant polymer blends in the construction of tire sidewalls and cover strips for pneumatic tires.

Ethylene propylene terpolymers (EPT) are unique elastomers in that they possess many of the properties possessed by conventional general purpose elastomers such as emulsion butadiene/styrene copolymers (SBR), natural rubber, cis-1,4 polybutadiene and synthetic cis-1,4 polyisoprene, while at the same time being much less susceptible to ozone degradation and weather checking than the conventional general purpose elastomers. This is probably due primarily to the lower degree of unsaturation possessed by EPT. There are many applications of elastomers which require that the elastomer be capable of resisting ozone degradation. Use in tires, such as in tire sidewalls and tire sidewall cover strips is exemplary of such applications. Use of EPT alone as a substitute for conventional rubbers where ozone resistance is desired has not been satisfactory since EPT alone is deficient in tack required for building purposes and the adhesion of a 100 percent EPT compound to conventional rubber compounds is less than satisfactory. Therefore it has been desirable to blend EPT with conventional rubbers to combine the ozone resistance of EPT with the properties of the conventional rubbers. This has presented a problem since conventional rubbers and EPT are not compatible in the sense that they do not form homogenous rubbery blends with conventional general purpose rubbers such as natural rubber and rubbery copolymers of butadiene and styrene (SBR) as readily as the conventional rubbers such as natural rubber and SBR will do with one another. EPT is also not compatible with conventional general purpose rubbers in forming rubbery blends in the sense that the EPT portion of the blend is normally under-vulcanized when the conventional rubber portion of the blend is at the proper state of vulcanization, while the conventional rubber portion of the blend is normally overvulcanized when the EPT portion of the blend is at the proper state of vulcanization. Such incompatibility can result in the delamination of the vulcanized blend. The difference in the states of vulcanization is understandable in view of the large difference in unsaturation between conventional rubbers and EPT. In conventional rubbers such as natural rubber and SBR, unsaturation often occurs in the range of 30 to 32 percent (i.e., 30 to 32 percent of the carbon to carbon linkages are double bonds), whereas in EPT unsaturation amounts to about 2 to 3 percent. Therefore, the more reactive conventional rubbers would tend to use up available elemental sulfur before EPT could cross link. Another problem in using EPT either alone or in blends is EPT's inability on vulcanization to adhere to conventional rubbers such as emulsion butadiene/styrene copolymers, natural rubber, cis- 1,4 polybutadiene and cis-1,4 polyisoprene. This inability results in a separation of the EPT blend from the conventional rubber. Neoprene rubber has been used with EPT to increase adhesion, but neoprene is an expensive component and therefore undesirable from an economic standpoint.

It is an object of this invention to provide an ozone resistant polymer blend containing EPT which will adhere on vulcanization to conventional rubbers. Another object of this invention is to provide a vulcanization system for an ozone resistant polymer blend containing EPT which will permit the blend on vulcanization to adhere to conventional polymers. Still another object is to provide ozone resistant products from a mixture of the aforementioned rubbery blends and vulcanization systems, said products being capable of adhering to conventional rubbery compositions on vulcanization.

A further specific object is to provide an ozone and weathering resistant cover strip containing EPT for tire sidewalls and capable of adhering to conventional rubbers on vulcanization. Other objects will appear as the description proceeds.

Some of the above objects are accomplished by blending from about 15 to about 35 parts of ethylene/propylene terpolymer (EPT) with from about 65 to about 85 parts of at least one material selected from the group of conventional rubbers consisting of natural rubber; polychloroprene; polyisoprenes; polybutadienes; and the rubbery copolymers of butadiene and styrene which contain at least 50 percent bound butadiene and combining the rubbery blend with a vulcanization system comprising (A) from about 0.75 to about 1.75 parts of at least one sulfenamide accelerator, and (B) from about 0.50 to about 1.50 parts of sulfur wherein the sum of components (A) and (B) does not exceed 2.75 parts. Still other objects will be accomplished by fabricating various ozone resistant products such as tire sidewalls and cover strips for tire sidewalls from the above rubbery blend/curing system mixtures and subsequently vulcanizing said mixtures.

The practice of this invention is found particularly beneficial when natural rubber and/or at least one rubbery copolymer of butadiene and styrene which contains at least 50 percent bound butadiene are used in combination with the EPT. Although this invention can be practiced using a blend of about 15 to about 35 parts of EPT with about 65 to about 85 parts of at least one conventional rubber, to form 100 parts of a rubbery blend, a preferred mixture comprises about 25 to about 30 parts of EPT in combination with about 70 to about 75 parts of at least one conventional rubber. The most highly preferred rubbery blends are comprised of from about 25 to about 30 parts of EPT in combination with from about 25 to about 45 parts of a natural rubber and from about 30 to about 45 parts of at least one rubbery copolymer of butadiene and styrene which contains at least 50 percent bound butadiene to form 100 parts of a rubbery blend.

Various nonconjugated dienes can be used to prepare the rubbery terpolymers of ethylene, propylene and a diene. Representative examples of the nonconjugated dienes are aliphatic dienes having from 6 to 22 carbon atoms such as 1,4-hexadiene, 1,5-heptadiene, 1,6-octadiene, 6-methyl-1,5-heptadiene, 7-methyl-1,6-octadiene, 11-ethyl-1,11-tridecadiene, 9- ethyl-1,9-undecadiene, 7-ethyl-1,7-nonadiene, 8-propyl-1,8-undecadiene, 8-ethyl-1,8-decadiene, 10-ethyl-1,9-dodecadiene, 12-ethyl-1,12-tetradecadiene, 13-n-butyl-1,12-tridecadiene and 15-ethyl-1,15-heptadecadiene, and cycloaliphatic dienes and substituted cycloaliphatic dienes such as dicyclopentadiene and 5-alkenyl-substituted-2-norbornenes such as 5-methylene-2-norbornene, 5-ethylidene-2-norbornene, and 2-alkyl-2,5-norbornadienes such as 2-methyl-2,5-norbornadiene. The generally preferred nonconjugated dienes are 1,4-hexadiene, dicyclopentadiene, 5-methylene-2-norbornene and 5-ethylidene-2-norbornene. Usually such terpolymers contain from about 20 to about 80 weight percent units derived from ethylene, from about 20 to about 80 weight percent units derived from propylene and from about 1 to about 15 weight percent units derived from the diene.

The polyisoprene and polybutadiene may be made by emulsion polymerization techniques. The stereospecific spatially oriented cis-1,4 versions of these polymers may be made by a variety of known techniques to produce polymers with a cis-1,4 content of 30 percent up to and in excess of 85 percent and a 1,4-content of 65 percent or above.

The copolymers of butadiene and styrene may be made by emulsion polymerization techniques and are normally referred to as hot and cold SBR types.

It has been found that any sulfenamide accelerator may be employed in the practice of the present invention. The term "sulfenamide accelerators" as used in this specification includes perthio sulfenamides. Representative examples of these are 2-(morpholinoldithio)benzothiazole, 2-(morpholinolthio)-benzothiazole, and N-cyclohexyl-benzothiazole-2-sulfenamide. Of these materials, 2-(morpholinoldithio)-benzothiazole is preferred.

Although the present invention will operate successfully where the vulcanization system consists solely of sulfenamide accelerators and sulfur, other conventional vulcanization system components such as zinc oxide, stearic acid and zinc stearate as well as other accelerators can also be used in combination with the sulfenamide and sulfur. For example, where part of the blend of this invention consists of an emulsion copolymer of butadiene and styrene it is sometimes desirable to use secondary accelerators, such as diphenyl guanidine, to obtain optimum results.

Although this invention can be practiced using a vulcanization system as described earlier herein a preferred vulcanization system is comprised of (A) from about 1.00 to about 1.50 parts of at least one sulfenamide accelerator and (B) from about 0.75 to about 1.25 parts of sulfur and wherein the sum of components (A) and (B) is from about 1.75 to about 2.25 parts. The most preferred system is comprised of about 1.00 part of at least one sulfenamide accelerator and 1.25 parts of sulfur.

Any sulfenamide accelerator may be used in the practice of the present invention. The following are illustrative of sulfenamide accelerators.

N,N-dimethyl-4,5-dimethylthiazoline-2-sulfenamide
N-cyclohexyl-4,5-dimethylthiazoline-2-sulfenamide
N-phenyl-4,5-dimethylthiazoline-2-sulfenamide
N-benzyl-4,5-dimethylthiazoline-2-sulfenamide
N-methyl-N-cyclohexyl-4,5-dimethylthiazoline-2-sulfenamide
N,N-diethyl-4,5-dimethyloxazole-2-sulfenamide
N,N-dibutyl-4,5-dimethyloxazole-2-sulfenamide
N,N-diamyl-4,5-dimethyloxazole-2-sulfenamide
2-(piperidinodithio)-benzothiazole
2-(piperizinodithio)-benzothiazole
N,N-dimethyl-4,5-diethylthiazole-2-sulfenamide
N-methyl-N-phenyl-benzothiazole-2-sulfenamide
2-(morpholinothio)-4,5-diethylthiazole-2-sulfenamide
2-(morpholinodithio)-4,5-diethylthiazole-2-sulfenamide
2-(morpholinotrithio)-4,5-diethylthiazole-2-sulfenamide
N,N-dimethyl-4,5-diethylimidazole-2-sulfenamide
2-(thiomorpholinodithio)-imidazole The preferred sulfenamides are represented by the following structural formula

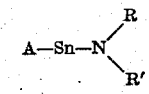

wherein A is a thiazole radical and R and R' are selected from the group consisting of hydrogen radicals; aliphatic radicals, such as alkyl radicals of one to 12 carbon atoms; cycloaliphatic radicals, such as cycloalkyl radicals of five to six carbon atoms; and aralkyl radicals, such as aralkyl radicals of seven to 12 carbon atoms and R and R' can be joined through a member of the group consisting of —CH$_2$—, —O—, —NH—, and —S— to constitute with the attached nitrogen group a cyclic radical and $n$ is an integer of a value from 1 to 3. When R and R' are joined through any one of the above groups to form a cyclic ring, the cyclic ring may be substituted. For example, if R and R' were propyl radicals, the first carbon atoms of each propyl group could be joined to the nitrogen atom while the second carbon atom could be joined to, e.g., and —O— radical. This would result in a 2,6-dimethyl morpholino radical. Similar results would occur if R and/or R' were branched chain radicals. Such compounds are intended to be included in the above structural formula. Representative examples of these sulfenamides are:

N,N-dimethyl-4,5-dimethylthiazole-2-sulfenamide
N,N-dimethyl-4,6-dimethylbenzothiazole-2-sulfenamide
N-cyclohexyl-4,6-dimethylbenzothiazole-2-sulfenamide
N-benzyl-4,5-dimethylthiazole-2-sulfenamide
N-methyl-N-cyclohexyl-4,5-dimethylthiazole-2-sulfenamide
2-(morpholinothio)-4,5-dimethylthiazole-2-sulfenamide
2-(morpholinodithio)-4,5-dimethylthiazole-2-sulfenamide
2-(morpholinotrithio)-4,5-dimethylthiazole-2-sulfenamide
2-(thiomorpholinothio)-4,5-dimethylthiazole-2-sulfenamide
2-(piperidinothio)-4,5-dimethylthiazole-2-sulfenamide
2-(piperazinothio)-4,5-dimethylthiazole-2-sulfenamide Preferably A in the above structural formula is a benzothiazole radical according to the following structural formula

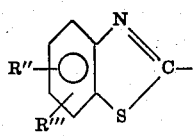

wherein R'' and R''' are selected from the group consisting of hydrogen, alkyl radicals of one to six carbon atoms, alkoxy radicals of one to six carbon atoms, halogen radicals and nitro radicals. Preferably R'' and R''' are hydrogen and

is a morpholino radical. Representative examples of these sulfenamides are

N,N-dimethyl-benzothiazole-2-sulfenamide
N,N-diisopropyl-benzothiazole-2-sulfenamide
N-cyclohexyl-benzothiazole-2-sulfenamide
N-benzyl-benzothiazole-2-sulfenamide
N-phenylethyl-benzothiazole-2-sulfenamide
N-methyl-N-cyclohexyl-benzothiazole-2-sulfenamide
2-(morpholinothio)-benzothiazole
2-(morpholinodithio)-benzothiazole
2-(morpholinotrithio)-benzothiazole
2-(thiomorpholinodithio)-benzothiazole
2-(piperidinothio)-benzothiazole
2-(piperazinodithio)-benzothiazole
2-(2',6'-dimethylmorpholinothio)-benzothiazole
2-(morpholinodithio)-4-methoxy-6-methyl-benzothiazole
2-(morpholinodithio)-4-chloro-6-nitro-benzothiazole The art contains a number of well-known methods of making sulfenamides. Some monothio sulfenamides (—SN—) can be made by reacting a sulfenyl chloride or a metal salt of a mercaptan with a primary or secondary amine in the presence of an oxidizing agent. Certain dithio sulfenamides (—S$_2$N—) can be made by reacting a mixture of a disulfide, sulfur and certain secondary amines in the presence of an oxidizing agent. Paul C. Jones in U.S. Pat. No. 2,273,321 describes a method of making a trithio sulfenamide (—S$_3$N—). The art discloses many more methods of making sulfenamides.

The rubbery blends may be mixed according to any of the conventional mixing means such as by internal mixing in an apparatus such as a Banbury mixer or on an open mill. Carbon black or any other reinforcing agent or filler, plasticizers, processing aids such as waxes, and extending oils can also be added to the rubbery blends. The rubbery components of the blends can also be mixed in the form of emulsions, suspensions, dispersions, solutions, etc. of said rubbery components. The reinforcing agents or fillers, plasticizers, etc. can be added in the same manner. The rubbery components, reinforcing agents, etc. can be added separately, in any combination and in any order. Any or all of these non-rubbery components may be added to the rubbery components before the blending of the rubbery components.

The components of the vulcanization system, i.e., the sulfenamides and sulfur and any other conventional curing system components as previously described may be mixed with the rubbery blends by any of the conventional mixing means such as by internal mixing in an apparatus such as a Banbury mixer or on an open mill. In addition, these materials can be added in the form of emulsions, solutions, dispersions, suspensions, etc. In addition, these materials can be added to the rubbery blends or components in the form of emulsions, solutions, dispersions, suspensions, etc., particularly where the rubbery blends of components are in the form of emulsions, solutions, dispersions, suspensions, etc. These materials can also be added separately in any combination and in any order.

A representative, but not limiting, method of mixing the rubbery blend is as follows. All of the rubbery components of the blend are added to a Banbury mixer. The rubbery components are mixed for about 60 seconds. Carbon black and stearic acid are then added and mixing is continued for approximately 30 seconds. Processing oils are then added and mixing continues, the batch being discharged about 180 seconds later at a temperature of about 280° to 320° F. Unless otherwise stated all of the rubbery blends described in the examples herein were mixed in a similar fashion.

A representative, but not limiting, method of mixing the vulcanization ingredients in the rubbery blend is as follows. The nonproductive stock is added to a Banbury mixer at room temperature and the ingredients of the vulcanization system, e.g., a sulfenamide and sulfur, are added thereto. The entire composition is then mixed for about 135 seconds and discharged at a temperature of about 210° to 230° F. Unless otherwise stated, all the rubbery blend/vulcanization ingredient mixtures described in the examples herein were mixed in a similar fashion.

The conventional rubbery compositions to which these EPT blends may be adhered include natural rubber, polychloroprene, polyisoprenes and polybutadienes, and in particular, polyisoprenes and polybutadienes having essentially all of their monomer units combined in a cis-1,4 structure and rubbery copolymers of butadiene and styrene which contain at least 50 percent bound butadiene or any mixtures thereof. EPT may also be used in these compositions, but normally should not exceed 35 parts of the rubbery portion of the composition.

These mixtures of rubbery blends and vulcanization systems may be used for various purposes. Among these are uses as tire sidewalls and as cover strips for tire sidewalls. A cover strip is a thin veneer normally composed of a weather resistant rubber compound which protects areas adjacent to a white or a colored sidewall from weathering degradation. Due to its weather resistance crack formation in the cover strip is normally very slight, thereby maintaining a suitable appearance of the tire sidewall during the life of the tire. Normally it is desirable that the cover strips be unvulcanized and then built into an unvulcanized tire to be subsequently vulcanized with the entire tire.

Tire applications are by no means the only applications for the blends of the present invention. Any of the mixtures of the present invention may be used in any application where a rubbery composition is desired (1) which has essentially the properties of the conventional general purpose polymers in the blend, (2) which is ozone resistant and weathering resistant and (3) which is capable of adhering to conventional rubbers on vulcanization.

The blends can be laminated to a conventional rubber or sprayed on in liquid form, e.g., as a solution. The entire composition can then be vulcanized, thereby resulting in a conventional rubber protected against ozone and weathering degradation by a veneer or a layer of an EPT blend. Exemplary would be hose or belt applications where one surface of the product might be made of the mixtures of this invention where ozone resistance and weathering resistance is desirable, and another surface comprised of a conventional general purpose rubber.

Ozone tests, adhesion tests and pierced groove flex tests were run on various rubber compositions to determine their ozone resistance, ability to adhere to other conventional rubber compositions on vulcanization and flex properties respectively.

The static ozone tests were carried out on 6 × 1.0 × 0.075 inch test samples cut from a vulcanized sheet. The ends of the samples were placed in metal holders and extended to a length of 112.5 percent of their original length. They were then surrounded by an atmosphere possessing an ozone concentration of 50 parts per hundred million by volume at a temperature of 100° F. for a period of 48 hours. The dynamic ozone tests were carried out on a 6 × ½ × 0.075 inch test samples also cut from a cured sheet. The ends of these samples were also placed in metal holders and intermittently extended to 111% of their original length at a frequency of 33 cycles per minute. They were placed in an atmosphere possessing an ozone concentration of 50 parts per hundred million by volume at a temperature of 100° F. for a period of 48 hours. Both the static and dynamic ozone samples were then visually evaluated for crack formation and rated according to the rating system disclosed by J. C. Ambelang and B. W. Mabeck in "Rubber World" 141, 86 (1959).

The 4 × 4 inch test samples for the adhesion tests were cut from uncured stock sheeted out at about 0.100 inch gauge. A fabric was applied to one side of each of the two compounds which were to be adhered to one another and subjected to the adhesion test. The fabric free faces of the two compounds were placed in contact with one another with a piece of Holland cloth being inserted partway (about one inch) from one side of the sample to prevent adhesion from occurring at this portion of the interface. The samples were then placed in a vulcanization press under a pressure of 550 psi minimum and vulcanized at a temperature of 300° F. A 1-inch wide sample was then cut from the 4 × 4 × ¼ inch block and placed in the test chamber at the desired test temperature, which was ordinarily 200° F. The nonadhering ends were placed in the clamps of a Scott Tester and the clamps separated at the rate of 2 inches per minute. The force in pounds required to separate the two compounds was taken as a measurement of the degree of adhesion between the compounds.

Pierced groove test samples were cured to form a 5⅞ × 1½ × ¼ inch test sample possessing a molded groove (1/4 inch diameter) perpendicular to the longitudinal axis of the sample. The center of the groove was pierced with a needle and placed in the clamps of the testing machine. The machine flexes the samples at 360 cycles/minute at room temperature, the strain ranging from about 30 to about 40 percent. Samples were observed at various time intervals up to 240 minutes. The length of the crack was measured in one-thirty-seconds of an inch.

The practice of this invention will be more fully understood by referring to the following examples which are illustrative rather than restrictive of the scope of the present invention.

EXAMPLES 1–8

Static and dynamic ozone resistance measurements were made on various rubbery blends. The results are listed in Table I. Examples 3 and 7 are illustrative of the performance of blends employed in the practice of the present invention while Examples 1, 2, 4, 5, 6 and 8 illustrate the performance of blends outside the scope of the present invention. Vulcanization systems employed in the practice of the present invention were used in all of the Examples 1 through 8. The following "basic compounding recipe" was used in compounding each sample. Except for the modifications expressly described, this recipe was used in compounding all of the samples in Examples 1 through 28.

| Compound | Parts |
|---|---|
| Rubbery Blend | 100.0 |
| Stearic Acid | 1.0 |
| OPF Carbon Black | 30.0 |
| Medium Processing Oil | 6.0 |

The amount of accelerator, 2-(morpholinodithio)-benzo-thiazole, and sulfur used in each blend is shown in Table I. The test samples were cured for 36 minutes at 300° F.

TABLE I (See below Table for column headings)

| A | B | C | D | E | F | G | H |
|---|---|---|---|---|---|---|---|
| 1 | 100 | — | — | 1.25 | 1.00 | 4/½ | 4/½–4 |
| 2 | 90 | 10 | — | 1.25 | 1.00 | 4/10 | 4/10 |
| 3 | 75 | 25 | — | 1.25 | 1.00 | 0/0 | 0/0 |
| 4 | 50 | 50 | — | 1.25 | 1.00 | 0/0 | 0/0 |
| 5 | — | — | 100 | 1.25 | 1.25 | 4/10 | 2/1–7 |
| 6 | — | 10 | 90 | 1.25 | 1.25 | 4/10 | 0/0 |
| 7 | — | 25 | 75 | 1.25 | 1.25 | 0/0 | 0/0 |
| 8 | — | 50 | 50 | 1.25 | 1.25 | 0/0 | 0/0 |

A - Example No.
B - Natural Rubber (No. 1 Smoked Sheet)
C - EPT(parts) - An ethylene/propylene terpolymer containing approximately 75/22/3 ethylene/propylene/dicyclopentadiene as bound monomers. Unless otherwise stated all of the ethylene/propylene terpolymers used in all examples were of this type.
D - SBR (parts) - An emulsion polymerized, high temperature butadiene/styrene copolymer possessing about 23.5 percent bound styrene. Unless otherwise stated all of the SBR polymers used in these examples were of this type.
E - Sulfur (parts)
F - 2-(morpholinodithio)benzothiazole (parts)
G - Static Ozone - The numerator value is a rating given the test samples based on the density of cracks formed during the ozone testing. As the number of cracks increase the numerator value increases. The denominator value is a rating based on the size of the cracks. This value increases as the crack size increases. A rating of 4/10 is the poorest rating under this rating system, while a rating of 0/0 is the best possible rating.
H - Kinetic Ozone The above data indicate that the blends within the practice of the present invention (Examples 3 and 7) possess effective resistance to ozone degradation, both static and dynamic. The data also demonstrate the vulcanized compatibility of the present blends within the practice of the present invention. The natural rubber (Example 1) although most of its area was cracked (numerator rating of 4 on both static and dynamic ozone testing) had a denominator rating of ½ on static testing and ½-4 on the dynamic testing, indicating relatively small cracks. However, when 10 parts of EPT were substituted for 10 parts of natural rubber (Example 2) the crack size (denominator rating of 10) increased drastically on both static and dynamic ozone testing. It is theorized that this is due to heterogeniety of the natural rubber/EPT blend. It is theorized that the ozone attacks the areas of the test sample occupied by the polymer containing the greatest amount of unsaturation, in this case the natural rubber phase, thereby resulting in large crack formation.

EXAMPLES 9 AND 10

A comparison of the results of Examples 9 and 10 in Table II demonstrates the fact that rubbers other than natural rubber and SBR may perform effectively in combination with EPT within the practice of the present invention. In Example 9 natural rubber was blended with SBR and EPT. In Example 10 synthetic cis-1,4 polyisoprene was blended with SBR and EPT. The rubbery blends were compounded with the same basic compounding recipe as described in Examples 1 through 8, using 1.25 parts of 2-(morpholinodithio)-benzothiazole and 1.25 parts of sulfur. The adhesion test samples were prepared and tests made in the same manner as described earlier herein.

TABLE II

| Rubbery Components | Example 9 | Example 10 |
|---|---|---|
|  | (Parts) | (Parts) |
| EPT | 25 | 25 |
| SBR | 30 | 30 |
| Natural Rubber | 45 |  |
| Synthetic cis-1,4 polyisoprene[2] |  | 45 |
| Cure - 18'/300° F. |  |  |
| 300% modulus (pounds/inch$^2$) | 850 | 775 |
| Tensile (pounds/inch$^2$) | 1,850 | 1,700 |
| % Elongation | 495 | 505 |
| Static Ozone | 0/0 | 0/0 |
| Kinetic Ozone | 0/0 | 0/0 |
| Adhesion to WSW[1] at room temperature, (Pounds): |  |  |
| Cure - 18'/300° F. | 65 | 61 |
| Cure - 36'/300° F. | 33 | 53 |

(1) White sidewall compound comprising a blend of SBR, natural rubber, titanium dioxide and a conventional vulcanization system.
(2) A cis-1,4 polyisoprene polymer possessing a cis content in excess of 85 percent.

The above data demonstrate that synthetic cis-1,4 polyisoprene may be substituted for natural rubber with relatively no change in the stress/strain properties or ozone resistance of the rubbery blends. The ability of the blend to adhere to a conventional rubber actually appears to be enhanced by the substitution of synthetic cis-1,4 polyisoprene for the natural rubber.

EXAMPLES 11 AND 12

The effect of the level of EPT in the rubbery blend on adhesion to a conventional rubber is shown by comparing Examples 11 and 12 in Table III. The basic compounding recipe was identical to that used in the compounding materials of Examples 1 through 8, the level of 2-(morpholinodithio)-benzothiazole being 1.0 part and the level of sulfur being 1.25 parts. In addition to the basic compound recipe, 3.0 parts of zinc oxide were used. The test samples for the adhesion test were prepared and tested in the same manner as those in Examples 9 and 10.

TABLE III

| Example | SBR (Parts) | Natural Rubber (Parts) | EPT (Parts) | Adhesion to WSW at 200° F. (Pounds) 18'/300°F. | 36'/300°F. |
|---|---|---|---|---|---|
| 11 | 30 | 45 | 25 | 25 | 22 |
| 12 | 20 | 45 | 35 | 7 | 9 |

A comparison of the results in Table III indicates that raising the level of EPT in an SBR/natural rubber/EPT blend from 25 to 35 parts while reducing the level of SBR from 30 (Example 11) to 20 parts (Example 12) results in a large reduction in the ability of the blend to adhere to conventional rubbers on vulcanization.

EXAMPLES 13 THROUGH 17

Examples 13 through 17 encompass a 25/30/45 EPT/SBR/natural rubber blend containing the basic compounding recipe with a variation in accelerator/sulfur systems as described in Table IV. Examples 14 through 17 contain vulcanization systems employed in the practice of the present invention.

Table IV

| Vulcanization Ingredients | Examples 13 | 14 | 15 | 16 | 17 |
|---|---|---|---|---|---|
| Benzothiazyl Disulfide (parts) | 0.80 | — | — | — | — |
| Diortho Tolyl Guandidine (parts) | 0.30 | — | — | — | — |
| 2-(Morpholinodithio)-benzothiazole (parts) | — | 1.00 | 1.00 | 1.50 | 1.25 |
| Sulfur (Parts) | 1.50 | 1.50 | 1.25 | 1.25 | 1.00 |
| Adhesion to WSW at 200° F. (Pounds) |  |  |  |  |  |
| 18'/300° F. | 6 | 17 | 31 | 29 | 33 |
| 36'/300° F. | 4 | 18 | 39 | 15 | 33 |

The data in Table IV disclose that a conventional accelerator/sulfur system (Example 13) does little to enhance the ability of the EPT blend to adhere to a conventional rubber system on vulcanization. The data in Examples 14 through 17 indicate that the sulfenamide/sulfur ratio and the total amount of sulfenamide plus sulfur may be varied while maintaining the ability of the blend to adhere to a conventional rubber.

EXAMPLES 18 THROUGH 22

The following examples involve a comparison of the adhesion properties of an EPT blend to a conventional rubber using different vulcanization systems. The basic compounding recipe was used with each blend. In Example 18 a conventional accelerator/sulfur system was used. In Examples 19 through 22 accelerator/sulfur systems within the practice of the present invention were used.

TABLE V

| Vulcanization Ingredients | 18 | 19 | Examples 20 | 21 | 22 |
|---|---|---|---|---|---|
| Benzothiazyl disulfide (parts) | 0.80 | 0.50 | — | — | — |
| Diortho Tolyl Guandidino (parts) | 0.30 | — | — | — | — |
| 2-(morpholinothio)-benzothiazole (parts) | — | 0.50 | — | — | — |
| N,N'-diisopropyl-benzothiazole 2-sulfonamide (parts) | — | — | 1.50 | — | — |
| N-cyclohexyl-benzothiazole-2-sulfonamide (Parts) | — | — | — | 0.90 | — |
| Sulfur (Parts) | 1.50 | 1.50 | 1.25 | 1.45 | 1.25 |
| 2-(morpholinyldithio)-benzotriazole (Parts) | — | — | — | — | 1.00 |
| 300% Modulus (pounds/inch$^2$) 18'/300° F. | 850 | 500 | 360 | 690 | 650 |
| Tensile (pounds/inch$^2$) 18'/300° F. | 2,000 | 1,700 | 1,500 | 1,800 | 625 |
| % Elongation 18'/300° F. | 520 | 630 | 700 | 560 | 540 |
| Adhesion to WSW (Pounds) | | | | | |
| 18'/300° F. | 6 | 27 | 10 | 24 | 31 |
| 36'/300° F. | 4 | 25 | 8 | 19 | 39 |

The data in Table V disclose that a conventional accelerator/sulfur system (Example 18) although providing adequate stress-strain properties, does little to enhance the ability of the EPT blend to adhere to a conventional rubber system on vulcanization. In addition, the data in Table V indicate that sulfenamides other than 2-(morpholinodithio)-benzothiazole are effective in improving the adhesion of EPT blends to conventional rubbers. Example 19 also indicates that an accelerator other than a sulfenamide accelerator may be used along with a sulfenamide accelerator to provide adequate adhesion to conventional rubbers.

EXAMPLES 23 THROUGH 26

These examples describe adhesion comparisons between black loaded and white loaded EPT blends using both standard vulcanization systems and vulcanization systems within the practice of the present invention.

The black loaded blend, 25/45/30 EPT/natural rubber/SBR (Blends A and B in Table VI), was compounded according to the basic compounding recipe and accelerator/sulfur systems added according to Table VI. The EPT/natural rubber/SBR white loaded blend containing 20 parts of EPT was compounded according to the following recipe.

| Component | Parts |
|---|---|
| Rubbery Blend | 100.0 |
| Stearic Acid | 1.0 |
| Loading | 71.5 |

TABLE VI

| Vulcanization Ingredients | Black loaded Blends A | B | C | White loaded Blends D |
|---|---|---|---|---|
| Benzothiazyl disulfide (parts) | 1.00 | — | 0.80 | — |
| Diortho tolyl guandine (parts) | — | — | 0.70 | 0.25 |
| Diphenyl guandine (parts) | 0.50 | — | — | — |
| 2-(morpholinodithio)-benzothiazole (parts) | — | 1.00 | — | 1.00 |
| Sulfur (parts) | 1.25 | 1.25 | 2.75 | 1.50 |

The test results from the adhesion tests between the above blends is shown in Table VII.

TABLE VII

| | | Adhesion to WSW at 200° F. (Pounds) | |
|---|---|---|---|
| Example | Adhered Blends | 18'/300° F. | 36'/300° F. |
| 23 | A/C | 22 | 23 |
| 24 | A/D | 53 | 45 |
| 25 | B/C | 25 | 25 |
| 26 | B/D | 77 | 68 |

The data in Table VII illustrate that where a vulcanization system of the type employed in the present invention is employed in either (Examples 24 and 25) or both (Example 26) of the two EPT blends which are adhered to one another on vulcanization, the adhesion is superior to that obtained using a conventional vulcanization system in both blends (Example 23). The optimum adhesion resulted when the vulcanization system of this invention was used in both blends.

EXAMPLES 27 AND 28

In the past various cover strip compositions involving the use of polychloroprene have been used. Examples 27 and 28 compare the stress-strain, ozone resistant, weathering resistant and adhesion properties of a black loaded cover strip compound comprising a 35/15/25/25 polychloroprene/chlorobutyl/SBR/natural rubber blend (Example 27) and a black loaded cover strip compound comprising a 25/45/30 EPT/natural rubber/SBR blend (Example 28). These data are listed in Table VIII.

Table VIII

| Rubbery Blend | 27 25/45/30 EPT/ natural rubber/SBR | Example 28 35/15/25/25 Polychloroprene polychlorobutyl SBR/natural rubber |
|---|---|---|
| Benzothiazyl disulfide (parts) | — | 1.0 |
| 2-(morpholinodithio)-benzothiazole (parts) | 1.0 | — |
| Sulfur (parts) | 1.25 | 0.75 |
| 300 percent Modulus (pounds/inch$^2$)— 18'/300°F. | 775 | 875 |
| Tensile (pounds/inch$^2$)— 18'/300°F. | 2,100 | 1,675 |
| Elongation(%)-13 18'/300°590 | | 460 |

| Pierced groove flex at room temperature | original | Over Aged 6 dgm/158°F | Original | Oven aged 6 dgm/158°F |
|---|---|---|---|---|
| 18'/300°F. | 8/32-240'$^5$ | 17/32-240' | 9/32-240' | 31/32-90' |
| 36'/300°F. | 10/32-240' | 20/32-240' | 28/32-140 | 40/32-120' |

| | | |
|---|---|---|
| Static Ozone | 0/0 | 4/178-1 |
| Kinetic Ozone | 0/0 | 1/1-4 |
| Static Sunchecking[6] | No cracks after 6 months exposure | 4/178 after 1 month exposure |
| Kinetic Sunchecking | Broke after 4 weeks | 2/1 |
| | exposure (no cracks) | |
| Adhesion (Pounds) at 200°F. to: | | |
| Conventional White Sidewall | | |
| Compound - 18'/300° | 31 | 19 |
| 36'/300°F. | 21 | 22 |

| Conventional Black Sidewall: | | |
|---|---|---|
| Compound - 18'/300°63 | | 35 |
| 36'/300°F. | 60 | 29 |
| Itself - 18'/300°75 | | 10 |
| 36'/300°F. | 59 | 12 |
| White Sidewall Compound containing 20 parts of EPT- | | |
| 18'/300°F. | 79 | — |
| 36'/300°F. | 75 | — |

(3) Commercial grade polychloroprene
(4) Polychlorobutyl polymer possessing an ML–8 at -b 260° F. of about 71.
(5) The fraction represents the length of the crack in one-thirty-seconds of an inch, while the whole number represents the number of minutes that the sample has been flexed.
(6) Static and Kinetic Sunchecking tests were run on a roof top, the samples being subjected to atmospheric conditions.

The above data illustrate that the EPT blends of the present invention possess stress-strain properties equal to, if not superior, to the stress-strain properties of the polychloroprene cover strip formulations while at the same time possessing superior original and aged flex, ozone resistance, weathering resistance and adhesion properties.

Tires possessing cover strips containing compositions of the types described in Examples 27 and 28 have been tested on vehicles at mileages from about 10,000 to about 30,000 miles. The cover strips containing the composition described in Example 28, a composition within the practice of the present invention, have continuously shown less cracking than the cover strips containing the composition described in Example 27.

While certain representative embodiments and details have been shown for the the purpose of illustrating the invention it will be apparent to those skilled in the art that various changes and modifications may be made therein without departing from the spirit or scope of the invention.

What I claim is:

1. A high vulcanized adhesion laminate comprising a rubbery blend containing ethylene propylene terpolymer directly vulcanized to a conventional rubber composition wherein the rubbery blend containing ethylene propylene terpolymer is a sulfur vulcanizable composition, the rubbery components thereof comprising (A) an ethylene/propylene terpolymer and (B) at least one rubber selected from the group consisting of natural rubber, polyisoprene, polybutadiene, and rubbery copolymers of butadiene and styrene which contain at least 50 percent by weight of bound butadiene, (A) and (B) being present in the ratio of (A) to (B) of about 15:85 to 35:65, the combined weight of A and B being 100 parts by weight, and containing (C) about 0.75 to about 1.75 parts by weight of a thiazole accelerator, the thiazole accelerator consisting essentially, of at least one sulfenamide accelerator and (D) about .50 to about 1.50 parts by weight of sulfur wherein the maximum amount of (C) plus (D) is about 2.75 parts, wherein the sulfenamide accelerator has the following structural formula

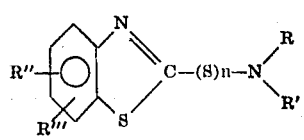

wherein R and R' are radicals selected from the group consisting of hydrogen, aliphatic, cycloaliphatic and aralkyl, and R and R' can be joined through at least one radical of the group consisting of $-CH_2-$, $-O-$, $-NH-$ and $-S-$ to form with the attached nitrogen a cyclic radical, and wherein $n$ is an integer of from 1 to 3, and wherein R'' and R''' are radicals selected from the group consisting of hydrogen, alkyl of one to six carbon atoms, alkoxy of one to six carbon atoms, halogen and nitro.

2. A high vulcanized adhesion laminate comprising a rubbery blend containing ethylene/propylene terpolymer directly vulcanized to a conventional rubber composition wherein the rubbery blend containing ethylene/propylene terpolymer is a sulfur vulcanizable composition, the rubbery components thereof comprising (A) a rubbery terpolymer of ethylene, propylene and a nonconjugated diene wherein the terpolymer contains from about 20 to about 80 weight percent units derived from ethylene, from about 20 to about 80 weight percent units derived from propylene and from about 1 to about 15 weight percent units derived from the nonconjugated diene and (B) at least one rubber selected from the group consisting of natural rubber, polyisoprene, polybutadiene, and rubbery copolymers of butadiene and styrene which contain at least 50 percent by weight of bound butadiene, (A) and (B) being present in the ratio of (A) to (B) of about 15:85 to 35:65, the combined weight of A and B being 100 parts by weight, and containing (C) about 0.75 to about 1.75 parts by weight of a thiazole accelerator, the thiazole accelerator consisting essentially, of at least one accelerator having the following structural formula

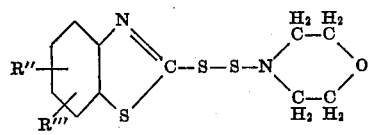

wherein R'' and R''' are selected from the group consisting of hydrogen, alkyl radicals of one to six carbon atoms, alkoxy radicals of one to six carbon atoms, halogen radicals and nitro radicals and (D) about 0.50 to about 1.50 parts by weight of sulfur wherein the maximum amount of (C) plus (D) is about 2.75 parts.

3. The high adhesion laminate of claim 1 wherein $n$ is 2 or 3, R and R' are methyl radicals or R and R' are joined to form a cyclic radical according to claim 1.

4. The high adhesion laminate of claim 1 wherein n is 1.

5. The high adhesion laminate composition of claim 1 wherein the radical

is a morpholino radical.

6. The high adhesion laminate of claim 5 wherein $n$ is 2.

7. The high adhesion laminate of claim 6 wherein R'' and R''' are hydrogen.

8. The high adhesion laminate of claim 1 wherein (A) is present at a level of from about 25 to about 30 parts; (B) is present at a level of about 70 to about 75 parts; (C) is present at a level of about 1.00 to about 1.50 parts; (D) is present at a level of about 0.75 to about 1.25 parts and (C) plus (D) does not exceed 2.25 parts.

9. The high adhesion laminate of claim 1 wherein (A) is present in an amount of about 25 to about 30 parts; wherein (B) is present in an amount of about 70 to about 75 parts; wherein (B) consists of about 25 to about 45 parts of natural rubber and about 30 to about 45 parts of at least one rubbery copolymer of butadiene and styrene which contains at least 50 percent by weight of bound butadiene; and wherein about 1 part of (C) and about 1.25 parts of (D) are present.

10. The high adhesion laminate of claim 1 wherein the sulfenamide accelerator is selected from the group consisting of
2-(piperidinodithio)-benzothiazole,
2-(piperizinodithio)-benzothiazole,
N,N-dimethyl-benzothiazole-2-sulfenamide,
N,N-diisopropyl-benzothiazole-2-sulfenamide,
N-cyclohexyl-benzothiazole-2-sulfenamide,
2-(morpholinothio)-benzothiazole,
2-(morpholinodithio)-benzothiazole,
2-(piperidinothio)-benzothiazole and
2-(2',6'-dimethylmorpholinothio)-benzothiazole.

11. A pneumatic tire the sidewall area of which contains the laminate of claim 1.

12. The pneumatic tire of claim 11 wherein the portion of the laminate containing the ethylene propylene terpolymer is a coverstrip.

* * * * *